April 24, 1962
B. F. RAYNES
3,030,692
SCRUBBER FOR MACHINE WAYS
Filed Aug. 25, 1958
2 Sheets-Sheet 1
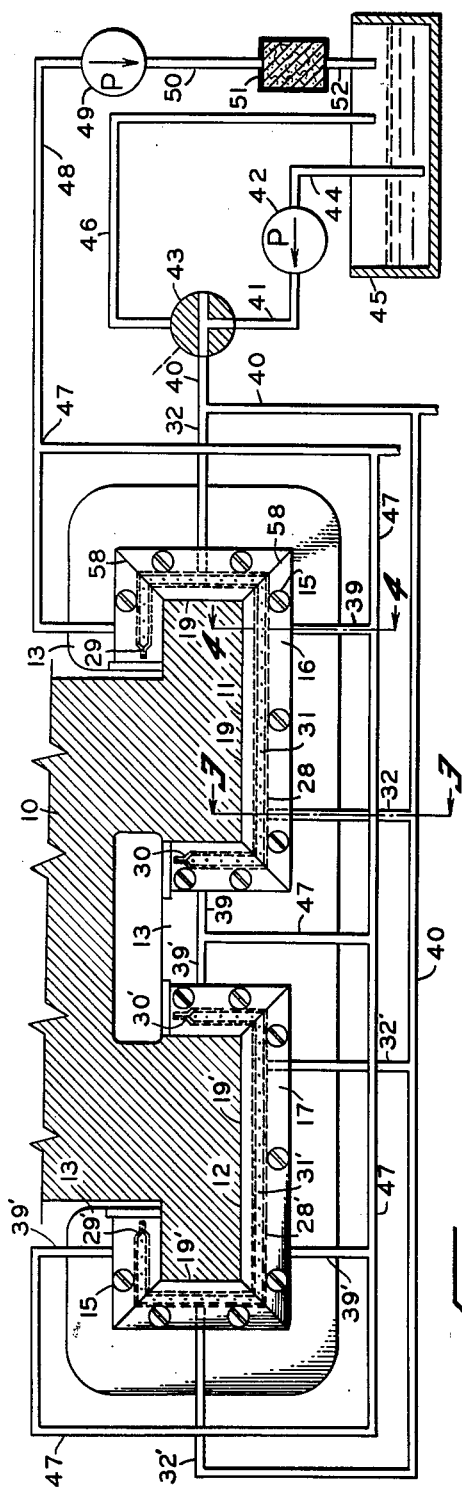
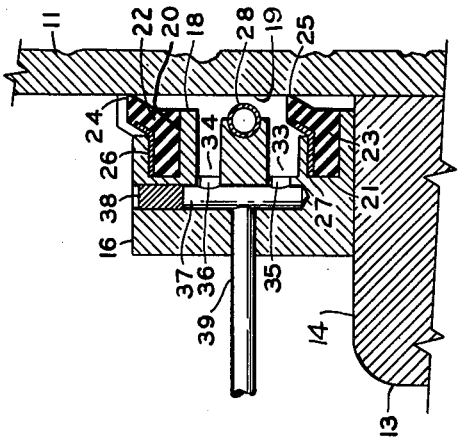
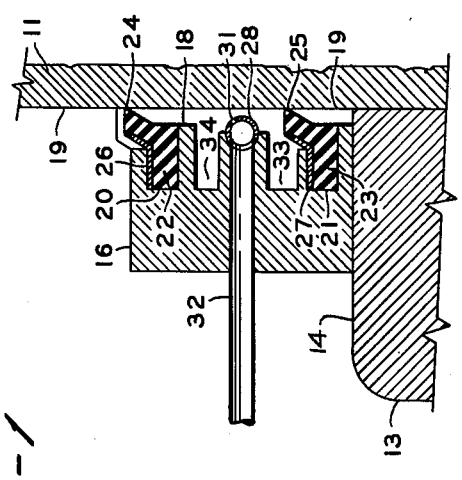
INVENTOR.
B.F. RAYNES
BY George E. Pearson
ATTORNEY

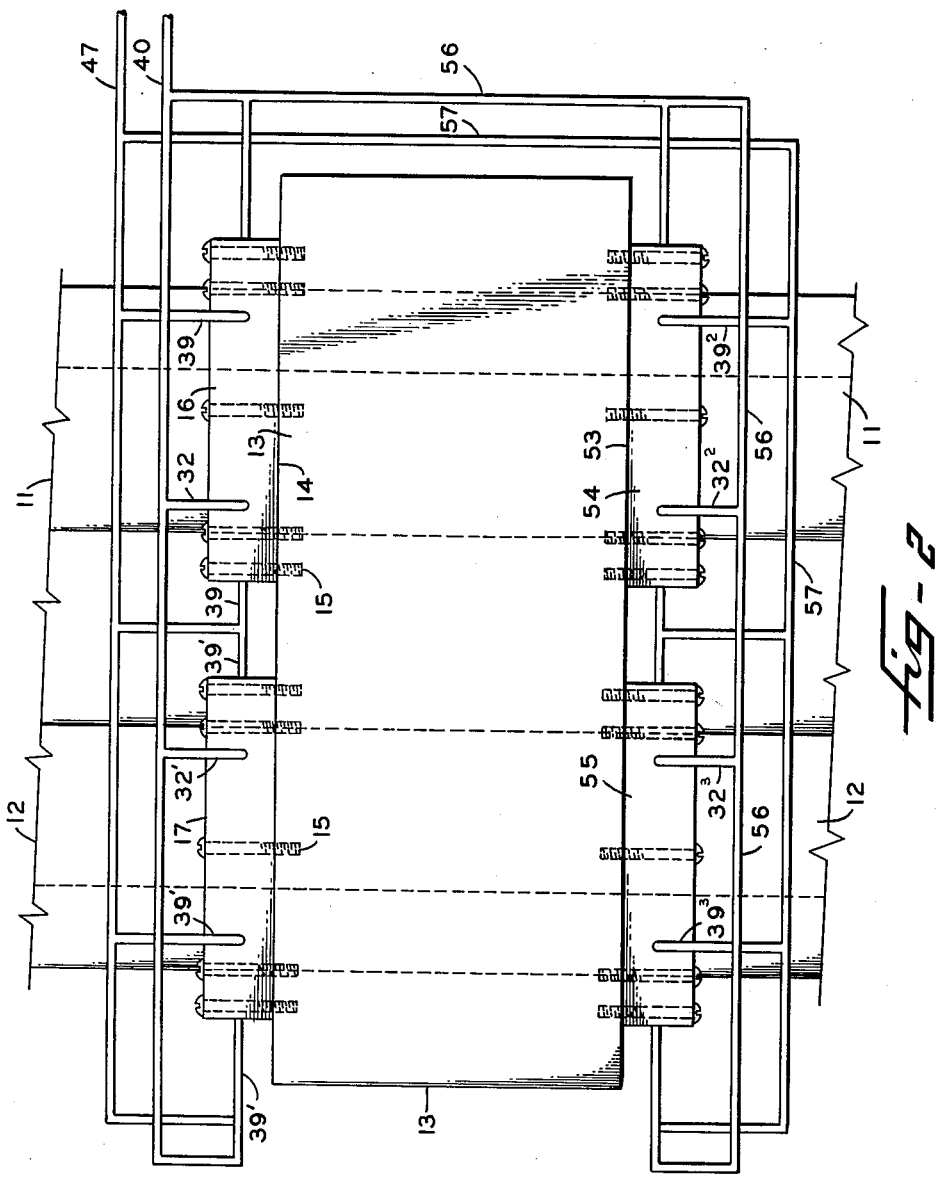

United States Patent Office 3,030,692
Patented Apr. 24, 1962

3,030,692
SCRUBBER FOR MACHINE WAYS
Burt F. Raynes, Chula Vista, Calif., assignor to Rohr Aircraft Corporation, Chula Vista, Calif., a corporation of California
Filed Aug. 25, 1958, Ser. No. 756,850
3 Claims. (Cl. 29—1)

This invention relates to an improvement in machine tools and more particularly to a means attachable to a machine tool for cleaning the ways which guide and support the moving parts of a machine during a machining operation.

The accuracy with which a machine tool, such as a lathe or milling machine operates is largely dependent on the accuracy with which the movements of the moving parts of the machine are guided by the ways on which they are mounted. The ways are machined to a precise size and shape and the moving part has a surface shaped complementary to the shape of the ways and is engaged therewith in a smooth sliding fit for movement to exact predetermined position. Any wear or damage to the contacting surfaces of the ways and moving parts will necessarily affect the accuracy with which the moving part may be positioned and prevent the machine from producing accurately machined parts.

A principal cause of excessive wear and damage to the contacting surfaces of the ways and moving part is foreign matter, such as particles of metal and dirt, which adheres to the surfaces of the ways and becomes engaged between the contacting surfaces as the moving part moves along the ways. By effectively cleaning the surfaces of the ways prior to passage of the moving part therealong, excessive wear and damage to these surfaces may be avoided and the service life of the machine greatly prolonged.

It is, therefore, a primary object of this invention to provide a means for cleaning the ways of a machine tool on which the moving parts thereof are supported, to remove all foreign matter therefrom prior to the passage of the moving part therealong.

A further object is to provide a means for cleaning the ways of a machine tool which is adapted for use on various kinds of machines.

Another object is to provide a means for cleaning the ways of a machine tool which does not interfere with the operation of the machine.

A further object is to provide a means for cleaning the ways of a machine tool in which pressurized fluid is discharged against the surfaces of the ways to remove foreign matter therefrom.

Another object is to provide a means for cleaning the ways of a machine tool which is easily attached to and removed from a machine.

A further object is to provide a means for cleaning the ways of a machine tool which is of relatively simple and inexpensive construction.

These and other objects and advantages will become apparent as the description of the invention proceeds.

For a better understanding of the invention reference is made to the accompanying drawing illustrating a preferred embodiment thereof and in which:

FIG. 1 is a top view in section of a portion of the vertical column of a machine tool having ways on which a movable part of the machine, having my novel cleaning attachment secured thereto, is mounted and which includes a schematic drawing of a part of the pressurized fluid system used therewith;

FIG. 2 is a front view of the vertical column and movable part of the machine having the cleaning attachment secured thereto and which includes an additional schematic drawing of the pressurized fluid system;

FIG. 3 is a sectional view of the cleaning attachment taken on line 3—3 of FIG. 1 and FIG. 4 is a sectional view of the cleaning attachment taken on line 4—4 of FIG. 1.

With reference to the drawing, a portion of the vertical column 10 of a machine tool, such as a milling machine (not shown), having ways 11 and 12 extending therealong which are shaped in section as shown in the drawing and have a movable part 13 of the machine mounted thereon in a known manner, is shown. Attached to the upper end 14 of part 13 by means of bolts 15 are rigid members 16 and 17 which are shaped to correspond to the shape of ways 11 and 12 as shown. Members 16 and 17 are identical in construction and for clarity the parts of member 17 corresponding to the parts of member 16 will be identified by the same reference numbers with superscripts added thereto and the description of the construction of these members will be in connection with member 16 only.

With reference to FIGS. 3 and 4 of the drawings, the face 18 of member 16 is spaced away from surface 19 of way 11 and is provided with recesses 20 and 21 which extend entirely around face 18. Contained within recesses 20 and 21 are sealing members 22 and 23 which are composed of a resilient, oil resistant material such as synthetic rubber, and have extending portions terminating in wiping edges which are yieldably 24 and 25 urged outwardly against surface 19 by metal strips 26 and 27 attached thereto. Extending along the center of face 18 of member 16 between sealing members 22 and 23 is a tube 28 having closed ends 29 and 30, which is provided with small spaced apart openings 31 along its entire length. Openings 31 are disposed opposite surface 19 and are arranged so that pressurized fluid discharged from tube 28 therethrough will be directed against surface 19 at various angles for a purpose to be explained. A series of spaced apart inlet tubes 32 passing through member 16 are connected to tube 28 to convey pressurized fluid thereto in a manner and for a purpose to be explained. Face 18 of member 16 is provided with recesses 33 and 34 extending along each side of tube 28 the entire length thereof which are provided with spaced apart openings 35 and 36 which communicate with spaced apart channels 37 in member 16. Channels 37 are formed by drilling vertical openings in member 16 to a desired depth and installing a closure 38 in the open ends thereof. Each of channels 37 have an outlet tube 39 connected thereto which extends outwardly through member 16 for a purpose to be explained.

Inlet tubes 32 and 32¹ are connected to a fluid supply tube 40 which is connected to the outlet tube 41 of a pump 42 through a valve 43. Pump 42 is provided with an inlet tube 44 which extends into a fluid supply tank 45. Valve 43 is of a known type which is arranged so that fluid discharged from pump 42 may be directed into tube 40 or returned to tank 45 through a fluid return tube 46. Outlet tubes 39 and 39¹ are connected to a fluid return tube 47 which is connected to the inlet tube 48 of a pump 49 similar to pump 42. The outlet tube 50 of pump 49 is connected to a filter 51 of a known type which is provided with a discharge tube 52 extending into tank 45.

Attached to lower end 53 of part 13 are rigid members 54 and 55 which are similar in every respect to members 16 and 17. Members 54 and 55 are provided with inlet tubes 32² and 32³ and outlet tubes 39² and 39³ which are similar to inlet and outlet tubes 32 and 39 respectively of member 16. Inlet tubes 32² and 32³ are connected to tubes (not shown) similar to tubes 28 and 28¹, within members 54 and 55 and to a fluid supply tube 56 which is connected to fluid supply tube 40. Outlet tubes 39² and 39³ are connected to a fluid return line 57 which is connected to fluid return tube 47.

The rigid members and tubes may be cut at points indicated by lines 58 in FIG. 1 and re-assembled in position on part 13 by welding or soldering to facilitate installation thereof if necessary.

The operation and function of members 16, 17, 54 and 55 are exactly the same and take place simultaneously during the operation of the entire apparatus. The operation of the above described apparatus will, therefore, be described in connection with member 16 only.

To use the apparatus pump 42 is started and valve 43 set to direct fluid discharged therefrom through outlet tube 41 to tube 40. The fluid enters tube 28 through inlet tubes 32 and is discharged through openings 31 therein against the surface 19 of way 11. The streams of fliud emerging from openings 31 strike surface 19 at various angles in a washing action which effectively removes all foreign matter therefrom. The discharged fluid and foreign matter accumulates in recesses 33 and 34 from which it is withdrawn through openings 35 and 36, channel 37, outlet tubes 39 and tube 47 by pump 49. The fluid is discharged from pump 49 through tube 50 into filter 51 to remove the foreign matter therefrom and then passes through tube 52 into tank 45 for re-use. The fluid used in the above described operation is preferably a light weight oil, however, other fluids may be successfully used for the same purpose. The tubes conveying the fluid are flexible wherever necessary to permit the apparatus to move freely with the moving parts of the machine.

The above described apparatus effectively cleans the ways of the machine at each end of moving part 13 so that the ways are cleaned prior to movement of parts 13 therealong in either direction. Also the cleaning action performed by the apparatus is done without the use of rigid scrapers or the like which have an abrasive action on the ways and result in additional wear thereto.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims and all changes which come within the meaning and range of equivalency of the claims are intended to be embraced therein.

Having thus described my invention, what I claim as new and useful and desire to secure by Letters Patent is:

1. In a machine tool having a stationary portion provided with machined ways and a movable portion slidable along said ways, means for cleaning the surfaces of said ways comprising: a rigid member secured to said movable portion in spaced relation to said ways and movable therealong; a pair of elongated resilient sealing means spaced from each other and secured to and extended from said member into yieldable engagement with a surface of said ways to form a chamber therewith, said sealing means extending in mutually spaced relation transversely of the direction of movement of said member along the ways and each having individual thereto a wiper edge and means yieldably urging the wiper edge against said surface of the ways; pressurized fluid supply means connected to said member and constructed and arranged to discharge fluid under pressure within said chamber and to direct the same in streams of sufficient force to strike and effect a washing action against said surface of the ways; and pressurized fluid discharge means connected to said member and constructed and arranged to withdraw from within said chamber said discharged fluid together with any foreign matter removed from said surface of the ways by said washing action thereon.

2. In a machine tool as in claim 1, said movable member having a pair of said means for cleaning the surfaces of the ways secured thereto at both ends thereof respectively.

3. Means for cleaning the surfaces of the ways as in claim 1, said pressurized fluid supply means comprising an elongated fluid supply tube disposed within said chamber and secured to said member in spaced relation to the surface of the ways, said tube having spaced apart openings extending along the length thereof and so disposed readially thereof as to direct the discharged fluid through said openings and against the surface of the ways at acute angles thereto.

References Cited in the file of this patent

UNITED STATES PATENTS

| | | |
|---|---|---|
| Re. 19,448 | Johnson | Feb. 5, 1935 |
| 1,982,345 | Kirby | Nov. 27, 1934 |
| 2,049,394 | Johnson | July 28, 1936 |
| 2,523,358 | Conner | Sept. 26, 1950 |
| 2,652,737 | Longstreet | Sept. 22, 1953 |

FOREIGN PATENTS

| | | |
|---|---|---|
| 862,701 | Germany | Jan. 12, 1953 |
| 915,548 | Germany | July 22, 1954 |
| 916,017 | Germany | Aug. 2, 1954 |